United States Patent [19]
Alten

[11] 4,382,307
[45] May 10, 1983

[54] TRANSFER BRIDGE

[76] Inventor: Kurt Alten, Ringstr. 14, D-3015 Wennigsen, Fed. Rep. of Germany

[21] Appl. No.: 243,713

[22] Filed: Mar. 16, 1981

[30] Foreign Application Priority Data

Mar. 17, 1980 [DE] Fed. Rep. of Germany ....... 3010209

[51] Int. Cl.³ .............................................. E01D 1/00
[52] U.S. Cl. ..................................... 14/71.7; 14/71.1
[58] Field of Search ...................... 14/71.3, 71.7, 71.1; 92/13.1, 13.6; 91/520, 528; 188/67

[56] References Cited

U.S. PATENT DOCUMENTS

| | | | |
|---|---|---|---|
| 1,518,788 | 12/1924 | Hanna | 92/13.1 |
| 2,478,790 | 8/1949 | Stephens | 92/13.1 |
| 2,881,458 | 4/1959 | Rodgers | 14/71.7 |
| 3,175,238 | 3/1965 | Pennington | 14/71.7 |
| 3,290,709 | 12/1966 | Whitenack | 14/71.7 |
| 3,388,413 | 6/1968 | Clarke | 14/71.7 |
| 4,110,860 | 9/1978 | Neff | 14/71.7 |
| 4,224,709 | 9/1980 | Alten | 14/71.3 |

FOREIGN PATENT DOCUMENTS

| | | | |
|---|---|---|---|
| 2545707 | 4/1977 | Fed. Rep. of Germany | 14/71.7 |
| 2545708 | 4/1977 | Fed. Rep. of Germany | 14/71.3 |
| 2815535 | 10/1979 | Fed. Rep. of Germany | 14/71.3 |
| 2915262 | 10/1980 | Fed. Rep. of Germany | 14/71.3 |
| 348650 | 10/1960 | Switzerland | 14/71.3 |

Primary Examiner—Nile C. Byers, Jr.
Attorney, Agent, or Firm—Becker & Becker, Inc.

[57] ABSTRACT

A transfer bridge for ramps. The bridge includes a bridge plate, the rear end of which is pivotable about a horizontal axis. The bridge plate is provided with a retractable and extendable extension which in turn is provided with tongues capable of being push-in. The extension is for placement upon the platform to be loaded or unloaded, and the tongues are automatically secured or arrested in the pushed-in condition. A drive, such as a piston, is associated with the tongues, or with the extension carrying the tongues, for retracting the tongues or the extension, subsequent to a pushing-in of the tongues, to form a gap between the tongues on the one hand and the platform (walls) on the other hand.

10 Claims, 6 Drawing Figures

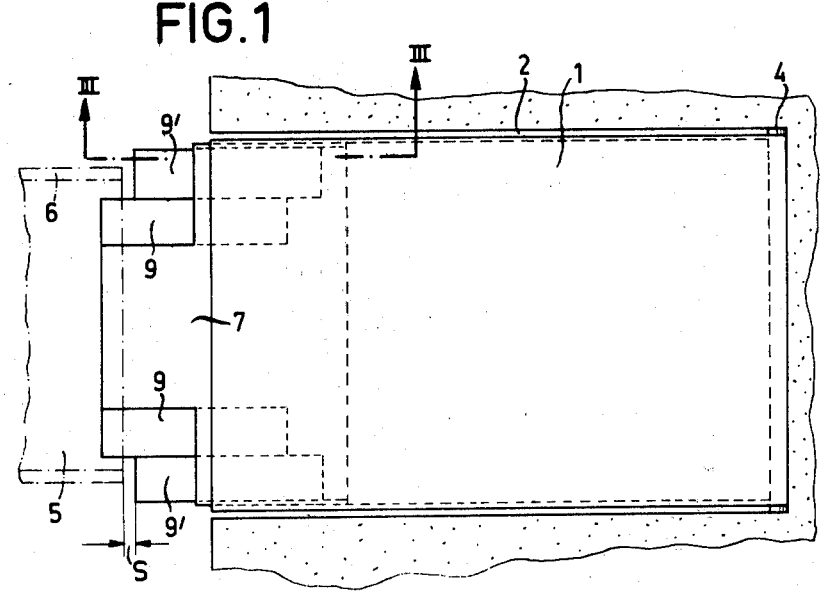
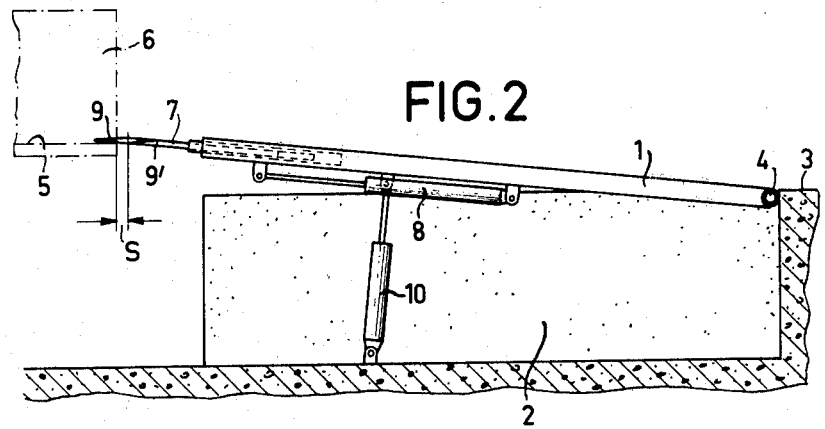

TRANSFER BRIDGE

The present invention relates to a dock leveler or transfer bridge for ramps, and has a bridge plate, the rear end of which is pivotable about a horizontal axis. The bridge plate is provided with a retractable and extendable extension, which in turn is provided with tongues which are capable of being pushed in; the extension is for placement upon a platform to be loaded or unloaded. In the operating condition of the bridge, the bridge plate is supported practically exclusively by the extension on the platform. The tongues, in the pushed-in condition, are automatically secured or arrested.

According to known proposals, the front of these tongues, which make possible an adaptation of the bridge width to the width of the platform, are embodied in a hinged manner. This precludes scoring, scraping or other damage when relative movement occurs between the free ends of the tongues and the side walls or tail boards of the vehicles or the like, for instance during lowering of the bridge plate onto the platform. However, it has been discovered that a sufficient protective effect is not attainable during the continuous engagement of the pivoted or swung-up hinged parts, especially with sensitive platforms or vehicles. Additionally, the pivoted or swung-up parts can create obstacles during the passage over the bridge.

Consequently, it is an object of the present invention to improve the initially mentioned bridges in such a way that the tongues are capable of being pushed-in, and additionally, however, in the lowered condition, i.e. in the operating condition of the bridge plate, contact between the platform or the structures of the vehicle on the one hand, and the tip of the tongue on the other hand, is precluded.

This object, and other objects and advantages of the present invention, will appear more clearly from the following specification in connection with the accompanying drawings, in which:

FIG. 1 is plan view of one embodiment of the inventive dock leveler or transfer bridge for ramps;

FIG. 2 is a side view of the bridge of FIG. 1 in its operating position;

Figure 3:
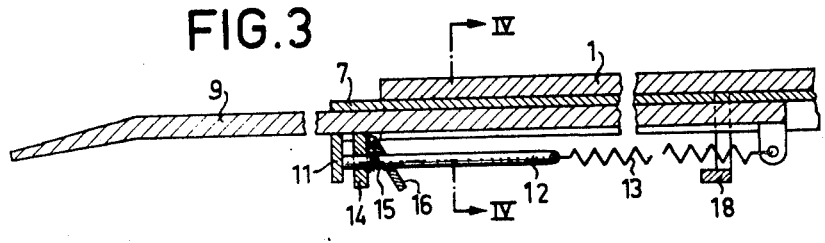
FIG. 3 is a section taken along the line III—III in FIG. 1.
Figure 4:
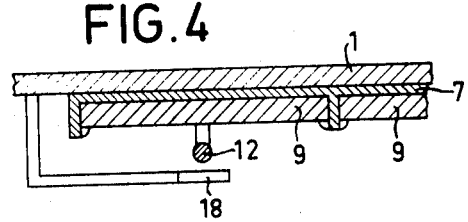
FIG. 4 is a section taken along the line IV—IV in FIG. 3.
Figure 5:
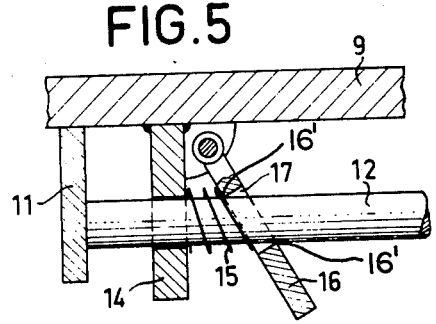
FIG. 5 shows an enlarged illustration of a detail of FIG. 3.
Figure 6:
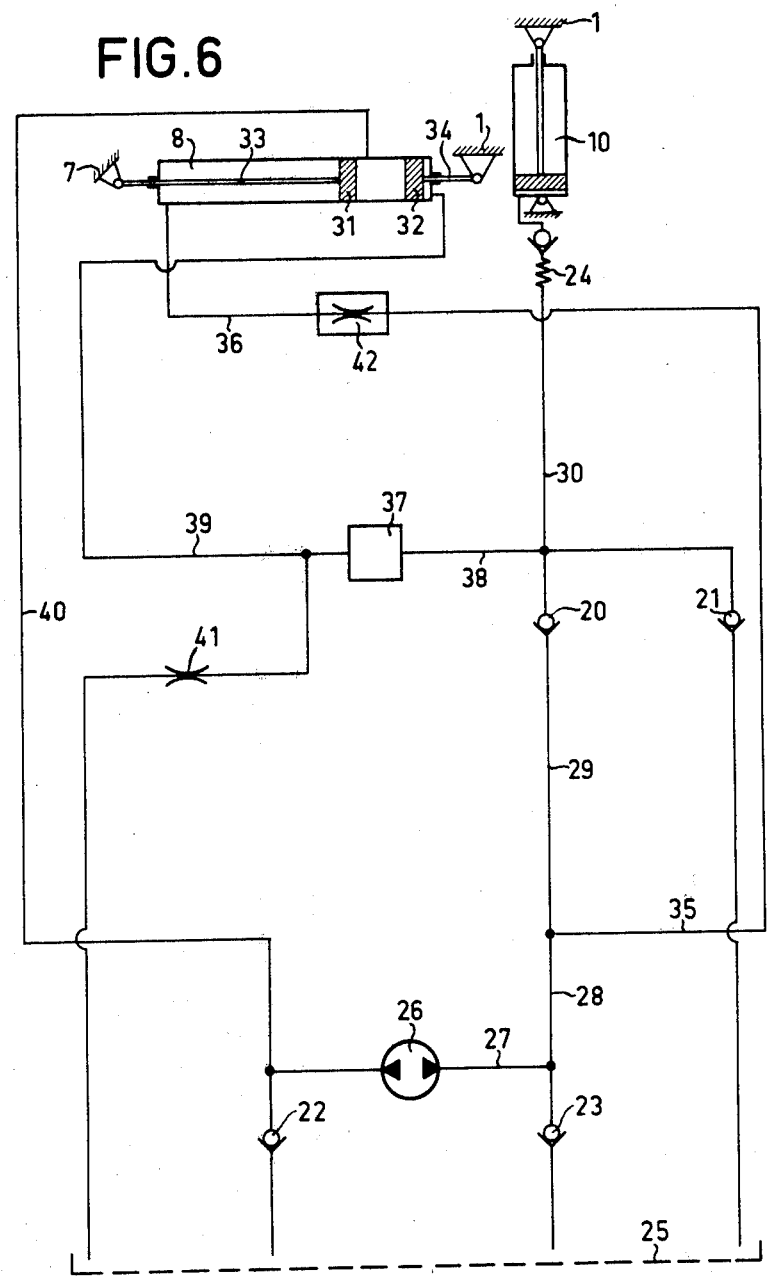

FIG. 6 diagrammatically illustrates a hydraulic system for the bridge of FIGS. 1–5.

The bridge of the present invention is characterized primarily in that a drive is associated with the tongues, or with the extension supporting or carrying the tongues, for retracting the extension or the tongues; this drive retracts the tongues or the extension, subsequent to a pushing-in of the tongues, to form a gap between the tips of the tongues and the platform (or the structure of the vehicle). In this connection, however, the drive is expediently utilized for the extension. If the drive is a hydraulic cylinder means, it receives an additional device for shortening the effective working or operating length; this is preferably attainable by an oppositely directed piston arrangement, in which connection one piston can carry out a retraction movement for shortening the effective length. The amount of the retraction movement is preferably constant, with values of approximately 10 mm–20 mm having proven to be advantageous.

A bridge embodied in this manner is operated in general as follows: When the truck or vehicle to be loaded or unloaded has been moved up to the ramp, the bridge plate is swung or pivoted upwardly with the extension retracted. The bridge plate is thereupon lowered again. When its front end is located approximately 20 cm above the platform of the vehicle, the extension is extended, whereby some of the tongues strike or engage the side walls of the truck or vehicle and are secured or arrested in the pushed-in state while the extension moves into the desired end position. When this has been attained, the extension, together with the tongues located thereon, are retracted by a fixed amount (for instance 15 mm) by way of means still to be described. Subsequently, the extension is lowered onto the platform. The mentioned amount under these circumstances takes into consideration the further approaching of the tongue tips toward the side walls during downward pivoting of the extension, and in particular in such a manner that in the lowered state of the bridge, i.e. in the operating position, there still remains a small gap between the tongue tip and the vehicle with the platform.

According to further specific embodiments, the tongues or the extension are retractable by such an amount that with a retraction of an extension located above the platform, and a subsequent lowering of the extension onto the platform, there remains a sligbt gap of about 5 mm to 15 mm.

The working cylinder for moving the extension may have two oppositely movable pistons with piston rods, with the stroke of one of the pistons serving for retraction purposes. This working cylinder may be shortened by shifting the same piston.

The drive may be effected by the hydraulic medium which flows from the lifting cylinder, associated with the bridge plate, under the weight of the bridge plate. This lifting cylinder may have a spring-loaded check valve connected in advance thereof.

A throttle valve may be connected in the discharge conduit of the lifting cylinder, and ahead of the throttle valve a pressure conduit may branch off for driving purposes.

Referring now to the drawings in detail, the bridge plate 1, which is located inside a recess 2 of the dock or ramp 3, is journalled at its rear end about a horizontal axis 4 on the ramp 3, so that the bridge plate 1 can by pivoting be adapted to different height platforms 5 of trucks or other load-carrying vehicles to be loaded or unloaded. That wall of the vehicle laterally delimiting the platform 5 is designated with the reference numeral 6.

The hollow front end of the bridge plate 1 serves to receive and guide an extension 7, which is retracted by a working cylinder 8 into the bridge plate 1, or is extended thereby into the illustrated operating position, in which the tip or end of the extension 7 rests on the platform 5 in such a way that the bridge plate 1 is supported on the platform 5 exclusively by the extension 7.

So that the extension 7 can adapt to different widths of platforms, tongues 9 are provided on both sides of a rigid extension part. These tongues can be pushed-in in the longitudinal direction of the bridge, and are under the influence of a spring in such a manner that the pushing-in of the tongues can occur only by overcoming the spring force, for instance when the tongues 9 strike the walls 6 during extension of the extension 7. The tongues that engage the walls 6 are designated by the reference numeral 9'.

A hydraulic lifting cylinder 10 serves for lifting the bridge plate 1. This lifting cylinder 10 is supported at the bottom on the foundation of the ramp 3 or on the base of the recess 2, and engages at the top approximately in the middle of the bridge plate 1.

This lifting cylinder 10, and the working cylinder 8, are integrated in a hydraulic system, which is schematically reproduced in FIG. 6.

A rearwardly extending round bar or rod 12 is fastened to the front wall 11 of the extension 7 and protrudes through a hole or opening of a plate 14 as well as through a hole or opening with sharp edges 16' of a lever arm or bracket 16. This rod 12 extends exactly in the push-in direction of the tongues 9, and is located below each tongue 9. One end of a tension spring 13 is fastened to the end of the rod 12, and the other end of this spring 13 is fastened at the rear end of the tongue 9, and in particular in such a manner that a pushing-in movement of the tongue 9 is possible only by tensioning the tension spring 13. A plate 14 is fastened below the tongues 9 in order to hold or secure the tongues 9 in the pushed-in position. The rod 12 passes through a hole or opening in the plate 14 and serves as a support for a pressure or compression spring 15, which engages a pivotably-mounted lever arm or bracket 16 having a hole or opening through which the rod 12 likewise passes. The upper end of this bracket 16 is linked to the tongue 9, and the bracket 16 is provided with a bore 17 which is slightly larger than the diameter of the rod 12. Consequently, the bracket 16, under the influence of the spring 15, locates or adjusts at an incline to the rod 12 for holding thereof releasable upon compressing of spring 15 by pivotal movement of bracket 16 into vertical position. This inclined position, or the sharp edges 16' about the hole or opening of the bracket 16 which are thereby effective upon the rod 12, make possible a pushing-in movement of the tongues 9, yet preclude a movement of the tongues 9 in the opposite direction.

An abutment 18 is additionally fastened on the bridge plate 1, and in particular in such a manner that the lower, free end of the bracket 16 engages this abutment 18 when the extension 7, together with all of the tongues 9, reaches the rear end position, whereby also the tip of the extension 7 is located below the bridge plate 1. The bracket 16 abandons its inclined position when it strikes the abutment 18, as a result of which the binding effect is cancelled and the tongue 9 can spring back into its forward position, which, however, occurs in the rearward position of the extension 7, so that no disadvantageous effects are produced.

This binding effect can, of course, also be effected by other arrangements, for instance by means of toothed racks, or also by brakes. The important thing is that the pushing-in movement can occur, but an uncontrolled springing-out action of the tongue 9 under the effect of the tension spring 13 is precluded. Furthermore, this embodiment is also possible and advantageous with tongues which have a different support than that illustrated in the drawings.

The inventive transfer bridge has a hydraulic system in accordance with the schematic reproduction of FIG. 6, and includes the working cylinder 8 for the extension 7, and the lifting cylinder 10 for the bridge plate 1. Relief or check valves 20, 21, 22, 23 are provided which permit only upward flowing of the oil (upward as seen in the drawing); a further check valve 24 is located below the lifting cylinder 10, but this valve, under the load of the bridge plate 1, permits a return flow. A reversible pump 26 is located above a collecting point 25, and, depending upon its direction of rotation, conveys in either direction.

To lift the bridge plate, the pump 26 conveys by means of the conduits 27, 28, 29 and 30 into lifting cylinder 10. At the same time, the left portion of the working cylinder 8, which faces the extension 7, is likewise under pressure by way of the conduits 35, 36. The cylinder 8 is provided with two oppositely directed pistons 31, 32 having piston rods 33, 34. Also at the same time, the magnetic valve 37 is closed between the conduits 38, 39. The piston 32 under these conditions is also in its end position (piston rod 34 extended).

The pump 26 is reversed for extending the extension 7. In so doing, the piston 31 is acted upon by means of the conduit 40, and the piston 32 is simultaneously engaged. The piston rod 33 extends. The magnetic valve 37 is furthermore closed. Accordingly, the extension 7 assumes a position above the platform 5.

The electrical switch for the pump 26 is now released (the feed or advance button). Oil is pressed or forced out of the lifting cylinder 10 under the weight of the bridge plate 1; the bridge plate 1 starts to drop. At the same time, the magnetic valve 37 is opened. A pressure head results ahead of the throttle valve 41, and this pressure head also acts upon the rear surface of the piston 32 by way of the conduit 39. Accordingly, the piston 32 is moved toward the piston 31; in this manner the effective length of the working cylinder 8 is shortened, and the extension 7 is retracted by this amount, i.e., the extension is drawn-in again by this amount. It should be noted that when the extension 7 was extended, two tongues 9' engaged the walls 6. These tongues 9' remained during the further advancing movement of the extension 7. The pushed-in tongues 9 are also retracted by the mentioned amount during the return movement of the extension 7. A small gap is now located between the tips of the tongues and the walls 6, but this gap is partially closed again during further lowering of the bridge plate 1. The piston 32 and the piston rod 34 now have such a length that there still remains a small gap S, for instance of 5 mm–10 mm, which however is insignificant for the passage operation. This small gap S is located between the pushed-in tongues 9 and the walls 6 in the operating position of the extension 7, as a result of which damage to the walls 6 is also precluded.

A pressure limiting valve 42 is connected between the conduits 35, 36 for the purpose of precluding an extending or moving of the piston 31. A shortening of the length of the working cylinder 8, however, is always assured.

If the bridge is to be retracted into the rest position, the pump 26 must first act upon the lifting cylinder 10. At the same time, that surface of the piston 31 facing the extension 7 is pressurized by way of the conduits 35, 36. Accordingly, the extension 7 is retracted when the bridge plate 1 is lifted. The short piston rod 34 under these circumstances, under the tension or pulling force of the piston 32, is drawn into the position shown in the drawing, i.e., is moved into its starting position.

The bridge plate 1 again assumes the rest position under the effect of its own weight.

The present invention is, of course, in no way restricted to the specific disclosure of the specification and drawings, but also encompasses any modifications within the scope of the appended claims.

What I claim is:

1. A transfer bridge for use between a ramp and a platform traversible by a vehicle, said bridge comprising:
   a bridge plate having a first end and a second end, said first end being pivotably connected to said ramp in such a way as to be pivotable about a horizontal axis;
   a retractable and extendable extension provided in said second end of said bridge plate for placement on said platform;
   arresting means actuatable in response to a pushing-in movement of said extension held thereby in a pushed-in position;
   tongues supported by and extending from said extension, and capable of being respectively pushed-in, i.e., of being pushed toward said first end of said bridge plate, said tongues, in the pushed-in state, being automatically arrested in position by said arresting means; and
   drive means associated with one of said extension and said tongues for retracting same, subsequent to a pushing-in of said tongues, to form a gap between said pushed-in tongues and said platform rather than moving said tongues against a vehicle.

2. A transfer bridge according to claim 1, in which said gap is 5–15 mm when non pushed-in tongues of said extension rest on said platform.

3. A transfer bridge according to claim 1, in which said drive means is a working cylinder for extending as well as retracting said extension, said working cylinder including two oppositely movable pistons having respective piston rods, the stroke of one of said pistons serving for said retraction.

4. A transfer bridge according to claim 3, in which said working cylinder can be shortened by shifting of said one piston.

5. A transfer bridge according to claim 1, which includes a lifting cylinder operatively connected to said bridge plate for effecting placement of tongues of said extension on said platform, said lifting cylinder including a hydraulic medium, the operation of said drive means being effected by hydraulic medium which flows out of said lifting cylinder under the weight of said bridge plate.

6. A transfer bridge according to claim 5, in which a spring-loaded check valve precedes said lifting cylinder.

7. A transfer bridge according to claim 5, which includes a discharge conduit leading from said lifting cylinder, and which includes a throttle valve connected in said discharge conduit, and, ahead of said throttle valve, a pressure conduit branching off from said discharge conduit and leading to said drive means.

8. A transfer bridge according to claim 1, in which said arresting means includes a lever-arm bracket having a sharp edging, and a rod engagable by said sharp edging to hold said extension including said tongues therewith to preclude a movement of said tongues in an opposite direction.

9. A transfer bridge according to claim 8, in which said bracket has a hole therethrough surrounded by said sharp edging.

10. A transfer bridge according to claim 8, in which a spring means surrounds said rod and adjusts said bracket at an incline for engagement of said sharp edging against said rod.